(12) United States Patent
Wakana (10) Patent No.: US 11,363,152 B2
(45) Date of Patent: Jun. 14, 2022

(54) IMAGE FORMING APPARATUS

(71) Applicant: CANON KABUSHIKI KAISHA, Tokyo (JP)

(72) Inventor: Toru Wakana, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/739,542

(22) Filed: Jan. 10, 2020

(65) Prior Publication Data

US 2020/0228673 A1 Jul. 16, 2020

(30) Foreign Application Priority Data

Jan. 15, 2019 (JP) .............................. JP2019-004212

(51) Int. Cl.
*G06F 3/12* (2006.01)
*H04N 1/00* (2006.01)

(52) U.S. Cl.
CPC ..... *H04N 1/00697* (2013.01); *H04N 1/00623* (2013.01); *H04N 1/00779* (2013.01)

(58) Field of Classification Search
CPC .......... H04N 1/00697; H04N 1/00623; H04N 1/00694; H04N 1/00779
See application file for complete search history.

(56) References Cited

U.S. PATENT DOCUMENTS

| | | | | |
|---|---|---|---|---|
| 5,172,178 A | * | 12/1992 | Oushiden ........... | G03G 15/5095 399/376 |
| 2001/0021036 A1 | * | 9/2001 | Nimura .............. | H04N 1/00639 358/1.12 |
| 2004/0184058 A1 | * | 9/2004 | Miyajima ........... | B41J 11/0095 358/1.12 |
| 2007/0047979 A1 | * | 3/2007 | Ai ...................... | G03G 15/6508 399/23 |
| 2009/0141297 A1 | * | 6/2009 | Aizono ................ | G06F 3/1208 358/1.9 |
| 2012/0327461 A1 | * | 12/2012 | Kiuchi ................ | G06K 15/005 358/1.15 |

* cited by examiner

*Primary Examiner* — Moustapha Diaby
(74) *Attorney, Agent, or Firm* — Venable LLP (57) ABSTRACT

An image forming apparatus includes an image forming portion configured to form an image on a sheet; a plurality of trays on which insert sheets are to be stacked; a setting unit configured to set, when an insert sheet is not stacked on a first tray specified by a print job among the plurality of trays, to perform an automatic feed changeover for feeding an insert sheet from a second tray on which the insert sheet is stacked among the plurality of trays; and a controller configured to disable, even when it is set to perform the automatic feed changeover, the automatic feed changeover when an insert sheet is not stacked on the first tray at a time of feeding a first insert sheet from a start of the print job.

8 Claims, 10 Drawing Sheets

IMAGE FORMING APPARATUS

BACKGROUND OF THE INVENTION

Field of the Invention

The present invention relates to an image forming apparatus including a plurality of trays on which insert sheets are stacked.

Description of the Related Art

There is known an image forming apparatus capable of generating printed matter via a printer driver from document data generated by a user using some application. There is also known an insertion function in which a preprinted sheet (hereinafter referred to as an "insert sheet") printed in advance is fed from an inserter connected to the image forming apparatus, and the insert sheet is inserted into the printed matter. As the insertion function, there are known a front cover function in which the insert sheet is inserted at the beginning of main text sheets (printed matter), a back cover function in which the insert sheet is inserted at the end of the main text sheets (printed matter), and an interleaving sheet function in which the insert sheet is inserted between the main text sheets (printed matter).

Many inserters have a structure in which a large number of insert sheets cannot be set on the tray. Therefore, when generating printed matter requiring a large amount of insert sheets, the insert sheets on the tray may quickly run out. In that case, the user is required to replenish the insert sheets on the tray every time the insert sheets on the tray run out, which is not efficient as a workflow.

In Japanese Patent Application Laid-Open No. 2008-239296, there is described an image forming apparatus in which the workflow is improved by including an automatic feed changeover function for automatically changing over a plurality of trays arranged in an inserter. For example, even in a case in which there is no insert sheet on a first tray specified by a printer driver, when an insert sheet exists on a second tray, the insert sheet can be fed from the second tray by the automatic feed changeover function.

The insert sheet information specified by the printer driver includes a feeding portion of the insert sheet, a size of the insert sheet, and a type of the insert sheet. However, insert sheet information in which only the feeding portion of the insert sheet is specified by the printer driver may be input to the image forming apparatus. In such insert sheet information, the setting of the size and type of the insert sheet is undefined. For example, the insert sheet information output from the printer driver may indicate that the feeding portion of the insert sheet is the first tray, the size of the insert sheet is not specified, and the type of the insert sheet is not specified. When there are no insert sheets stacked on the first tray, the size and the type of the insert sheet on the first tray are in an undefined state (state in which insert sheet information is undefined). That is, the size and the type of the insert sheet in the insert sheet information output from the printer driver are undefined, and the insert sheet information of the first tray is in an undefined state. Even in such a case, when there are no insert sheets on the first tray and there is an insert sheet on the second tray, the insert sheet is fed by changing over the current feeding portion from the first tray to the second tray by the related-art automatic feed changeover function.

However, the user has specified the first tray by the printer driver, and thus the insert sheet stacked on the second tray may not be the size and type of insert sheet desired by the user. In that case, an insert sheet not intended by the user is fed (misfeed). There is a high likelihood that the insert sheet is a special sheet, and therefore misfeeding of the insert sheet is required to be avoided.

SUMMARY OF THE INVENTION

In view of the above, the present invention provides an image forming apparatus capable of preventing the feeding of an insert sheet not intended by the user.

In order to solve the above-mentioned problems, according to an embodiment of the present invention, there is provided an image forming apparatus comprising: an image forming portion configured to form an image on a sheet; a plurality of trays on which an insert sheet is to be stacked; a setting unit configured to set, when an insert sheet is not stacked on a first tray specified by a print job among the plurality of trays, to perform an automatic feed changeover for feeding an insert sheet from a second tray, on which the insert sheet is stacked, among the plurality of trays; and a controller configured to disable, even when it is set to perform the automatic feed changeover, the automatic feed changeover when an insert sheet is not stacked on the first tray at a time of feeding the first insert sheet from a start of the print job.

Further features of the present invention will become apparent from the following description of exemplary embodiments with reference to the attached drawings.

DESCRIPTION OF THE EMBODIMENTS

Modes for carrying out the present invention are described below with reference to the accompanying drawings.

(Network Configuration)

Figure 1:
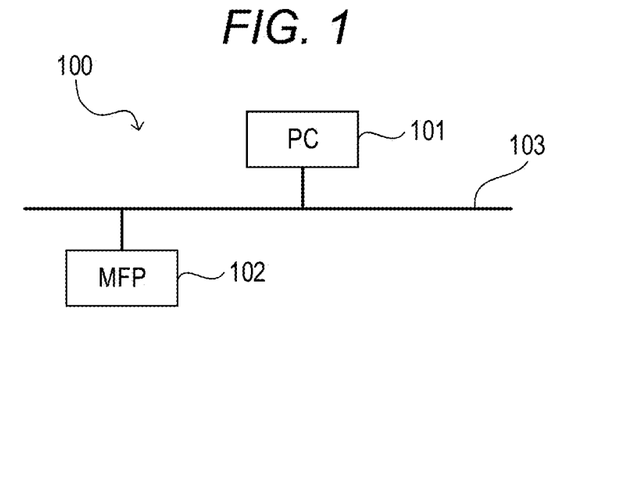
FIG. 1 is a diagram for illustrating a printing system.

First, a network configuration of a printing system 100 is described with reference to FIG. 1. FIG. 1 is a diagram for illustrating the printing system 100. The printing system 100 includes a host computer (hereinafter referred to as a "PC") 101 as an external device, a multi-function peripheral (MFP) 102 as a printing apparatus, and a network 103 such as a local area network (LAN) or Wi-Fi configured to electrically connect the PC 101 and the MFP 102. The PC 101 is configured to create document data by using some application, and to create print data by using a printer driver or the like. The MFP 102 is a multi-function peripheral in which a facsimile (FAX) function and a printer function are added to a copying machine. The MFP 102 includes, for example, an electrophotographic image forming apparatus as a printer function.

(MFP)

Figure 2:
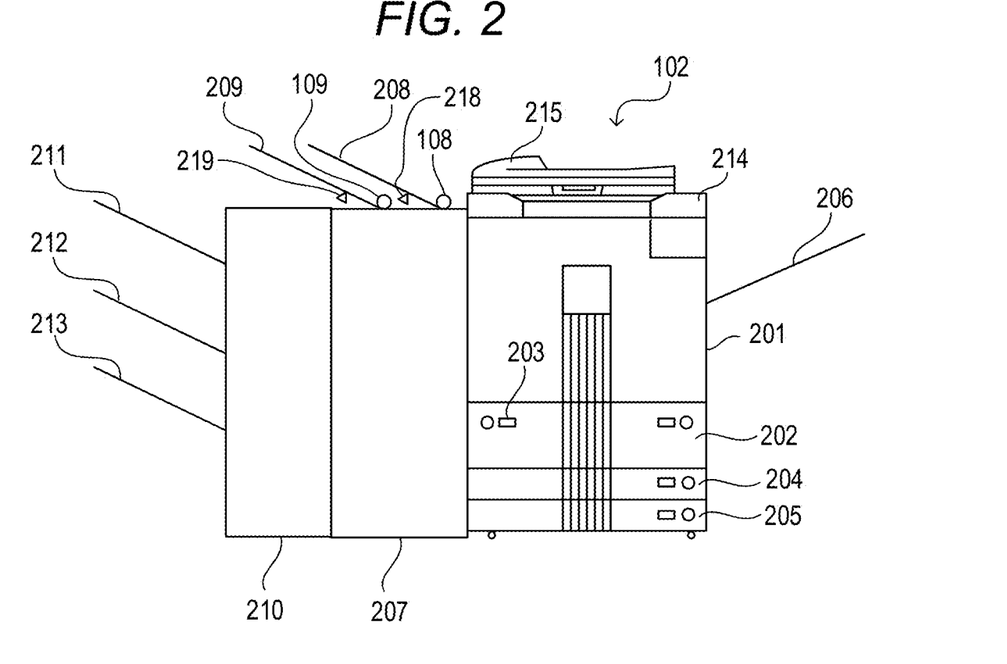
FIG. 2 is a diagram for illustrating an MFP.

Next, the MFP 102 is described with reference to FIG. 2. FIG. 2 is a diagram for illustrating the MFP 102. The MFP 102 includes a main body 201 as an image forming portion, an inserter 207, and a finisher (hereinafter referred to as a "post-processing apparatus") 210. The main body 201 of the MFP 102 includes a first feeding deck 202, a second feeding deck 203, a third feeding deck 204, and a fourth feeding deck 205, which can be pulled out. The first feeding deck 202, the second feeding deck 203, the third feeding deck 204, and the fourth feeding deck 205 are a plurality of sheet feeding portions configured to accommodate recording media (hereinafter referred to as "sheets") on which an image is to be formed by the MFP 102. A manual feed tray 206 is arranged on the side of the main body 201 of the MFP 102. Sheets on which printing is to be performed by the MFP 102 are set in the manual feed tray 206. An image reading apparatus (image scanner) 214 configured to read an image of an original and an automatic original feeding apparatus 215 configured to feed the original to the image reading apparatus 214 are arranged at a top part of the MFP 102.

(Inserter)

The inserter 207 is connected to the main body 201 of the MFP 102. The inserter 207 includes a plurality of trays (insert sheet feeding portions) on which insert sheets to be inserted into the inserter are set. In this embodiment, the inserter 207 includes a first tray 208 and a second tray 209. The insert sheets to be inserted between the sheets (printed matter) on which an image has been formed by the MFP 102 are set (stacked) on the first tray 208 and the second tray 209. The first tray 208 includes a sheet sensor 218 and the second tray 209 includes a sheet sensor 219. The sheet sensor 218 and the sheet sensor 219 are configured to detect whether or not an insert sheet is set on the first tray 208 and the second tray 209, respectively. The first tray 208 includes a first feed roller 108 as a first feeding unit. The first feed roller 108 is configured to feed the insert sheet set on the first tray 208 to the inserter 207. The second tray 209 includes a second feed roller 109 as a second feeding unit. The second feed roller 109 is configured to feed the insert sheet set on the second tray 209 to the inserter 207.

(Post-Processing Apparatus)

The post-processing apparatus 210 is connected to the inserter 207. The post-processing apparatus 210 includes a plurality of discharge trays onto which sheets on which an image has been formed by the MFP 102 and insert sheets inserted by the inserter 207 are discharged. In this embodiment, the post-processing apparatus 210 includes a first discharge tray 211, a second discharge tray 212, and a third discharge tray 213.

(Data Processing System)

Figure 3:
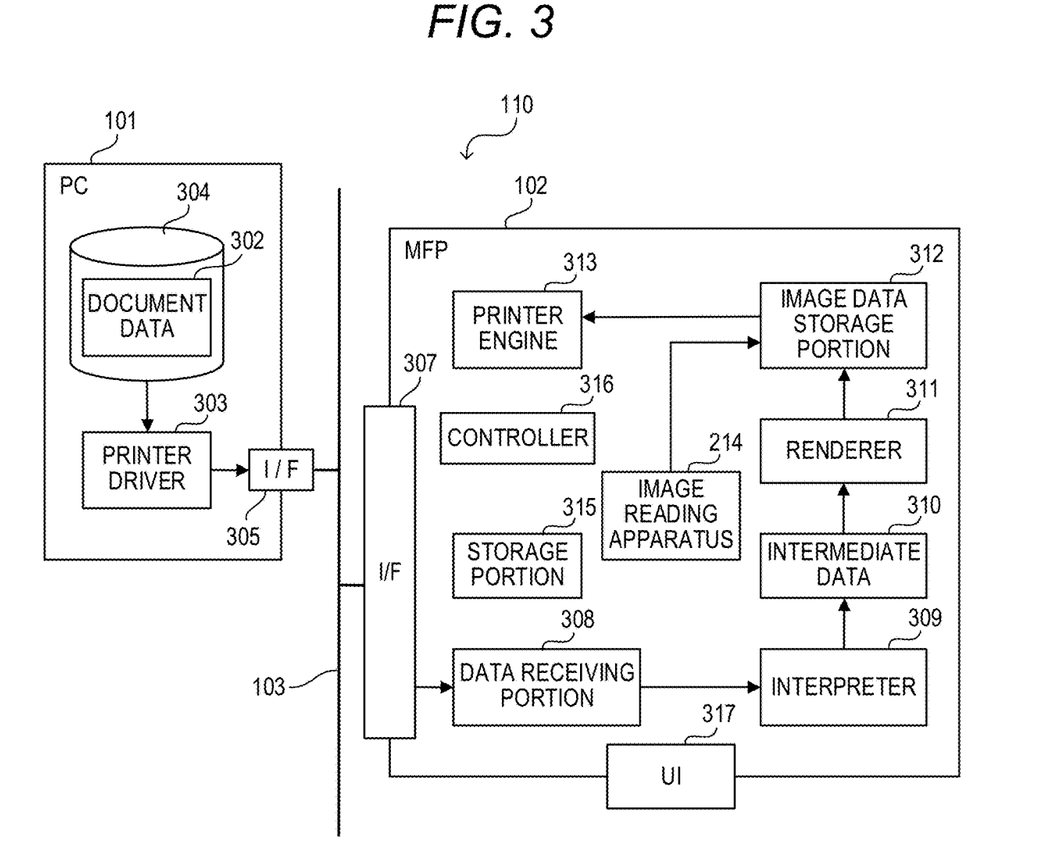
FIG. 3 is a block diagram for illustrating a data processing system.

Next, a data processing system 110 having the PC 101 and the MFP 102 is described with reference to FIG. 3. FIG. 3 is a block diagram of the data processing system 110. The PC 101 includes a printer driver 303, a storage area 304, and a communication interface (hereinafter referred to as "I/F") 305. Document data 302 is stored in the storage area 304. The document data 302 is created by a document creation application installed on the PC 101. The printer driver 303 is configured to create page description language (PDL) data from the document data 302. The PDL is a page description language such as PostScript (PS), Printer Command Language (PCL), or LBP Image Processing System (LIPS). The PDL may also be a page description language other than those described above. The storage area 304 is configured to store the document data 302 and the document creation application for creating the document data 302. The storage area 304 may also store the printer driver 303. The I/F 305 is configured to transmit the PDL data (print job) created by the printer driver 303 to the MFP 102 via the network 103.

The MFP 102 includes an I/F 307, a data receiving portion 308, an interpreter 309, a renderer 311, an image data storage portion 312, a printer engine 313, an image reading apparatus 214, a storage portion 315, a controller 316, and a user interface (hereinafter referred to as a "UI"). The I/F 307 is configured to receive PDL data transmitted from the PC 101. The data receiving unit 308 is configured to receive the PDL data via the I/F 307 and store the data. The interpreter 309 is configured to analyze the PDL data received by the data receiving portion 308. The interpreter 309 can analyze the format of the PDL, such as PS, PCL, and LIPS. The interpreter 309 may also analyze formats other than PS, PCL, and LIPS. The controller 316 is configured to convert the PDL data analyzed by the interpreter 309 into intermediate data 310. The renderer 311 is configured to analyze the intermediate data 310 and convert the data into image data. The image data storage portion 312 is configured to store image data obtained as a result of the processing by the renderer 311. The printer engine 313 is configured to convert the image data stored in the image data storage portion 312 into video data and execute an image forming operation.

The image reading apparatus 214 is configured to read an image of the original. The image read by the image reading apparatus 214 is stored in the image data storage portion 312 as image data. The storage portion 315 is configured to store the image data stored in the image data storage portion 312, and also to store setting information on various types of printing. The controller 316 is configured to execute programs for performing various types of processing. The UI 317 is configured to display an operation screen for the user to operate the MFP 102. The UI 317 is also configured to display a display screen illustrating setting information set in the MFP 102. The controller 316 stores in the storage portion 315 a setting value set by the user via the operation screen of the UI 317.

(Printing System Control Operation)

Figure 4:
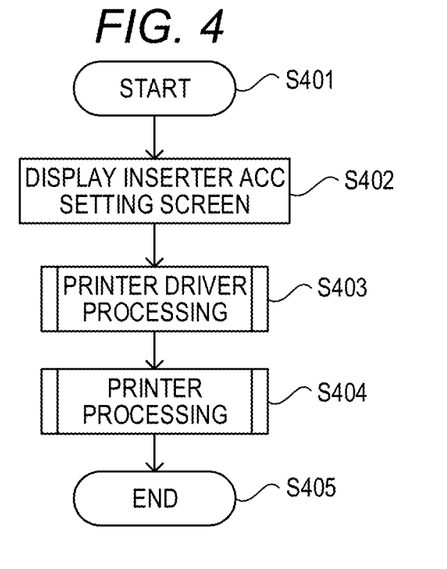
FIG. 4 is a flow chart for illustrating a control operation of the printing system.

Next, a control operation of the printing system 100 is described with reference to FIG. 4. FIG. 4 is a flow chart for illustrating the control operation of the printing system 100. In the printing system 100, the PC 101 and the MFP 102 are connected via the network 103. The document data 302 generated by the document creation application installed on the PC 101 is converted into PDL data by the printer driver 303. The PDL data is transmitted to the MFP 102 via the I/F 305, the network 103, and the I/F 307. The controller 316 then feeds a sheet from any one of the first feeding deck 202, the second feeding deck 203, the third feeding deck 204, the fourth feeding deck 205, and the manual feed tray 206 as the feeding unit. The MFP 102 forms an image on the sheet based on the image data converted from the PDL data. The controller 316 also feeds the insert sheet from the first tray 208 or the second tray 209 of the inserter 207. Then, the controller 316 discharges the sheet and the insert sheet to the first discharge tray 211, the second discharge tray 212, or the third discharge tray 213.

In Step S401 (hereinafter, "step" is omitted), the controller 316 starts the control operation of the printing system 100. In S402, the controller 316 displays the inserter automatic changeover setting screen on the UI 317. The user sets whether or not inserter automatic changeover (inserter automatic cassette changeover: inserter ACC) is to be performed via the inserter automatic changeover setting screen displayed on the UI 317 serving as a setting unit.

Figure 13:
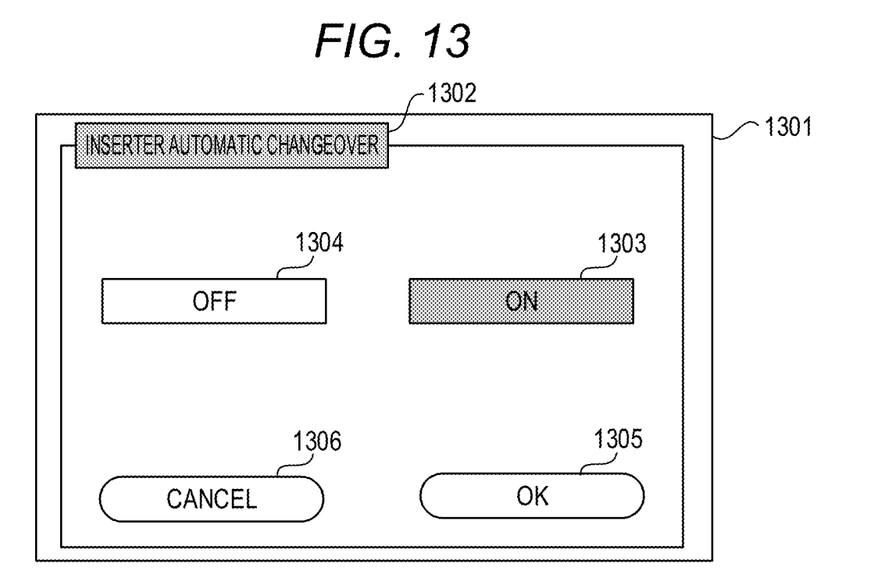
FIG. 13 is a diagram for illustrating an inserter automatic changeover setting screen.

FIG. 13 is a diagram for illustrating an inserter automatic changeover setting screen 1301. The inserter automatic changeover setting screen 1301 includes an inserter automatic changeover tab 1302, an ON button 1303, an OFF button 1304, an OK button 1305, and a cancel button 1306. The inserter automatic changeover tab 1302 indicates that the inserter automatic changeover setting screen 1301 is selected. The ON button 1303 indicates an "ON" option selected by the user when the inserter automatic changeover is to be performed. The OFF button 1304 indicates an "OFF" option selected by the user when the inserter automatic changeover is not to be performed. In FIG. 13, the ON button 1303 is selected and displayed in gray, the OFF button 1304 is not selected and displayed in white, and an ON state in which the inserter automatic changeover is to be performed is illustrated. The OK button 1305 is a confirmation button for confirming the inserter automatic changeover setting screen on the inserter automatic changeover setting screen 1301. When the user touches the OK button 1305, the inserter automatic changeover setting screen on the inserter automatic changeover setting screen 1301 is set. The user can cancel the inserter automatic changeover setting screen on the inserter automatic changeover setting screen 1301 by touching the cancel button 1306.

When the inserter automatic changeover setting screen 1301 is set to the ON state in which the inserter automatic changeover is to be performed, the inserter automatic changeover is performed between the first tray 208 and the second tray 209 of the inserter 207. When the OFF state is set, that is, when the inserter automatic changeover is not to be performed, the inserter automatic changeover is not performed between the first tray 208 and the second tray 209 of the inserter 207. In this embodiment, there is described a case in which the inserter automatic changeover is set to the ON state.

In S403, the PC 101 performs printer driver processing. In the printer driver processing, the user generates document data 302 by using the document creation application installed on the PC 101. The printer driver 303 generates PDL data from the document data 302. The printer driver 303 also performs various settings to be used when printing is performed in accordance with the PDL data. The PDL data is transmitted to the MFP 102 via the I/F 305, the network 103, and the I/F 307. The printer driver processing to be executed in S403 is described later with reference to FIG. 5.

In S404, the MFP 102 performs printer processing. In the printer processing, the controller 316 controls the data receiving portion 308, the interpreter 309, and the renderer 311, receives PDL data, and converts the PDL data into image data. The controller 316 then controls the printer engine 313, converts the image data into video data, and forms an image on a sheet based on the video data. The controller 316 also analyzes the PDL data in order to determine whether or not there is an insert sheet setting. When there is an insert sheet setting, the controller 316 feeds an insert sheet from the inserter 207 and inserts the sheet into the printed matter. The printer processing to be executed in S404 is described later with reference to FIG. 6. In S405, the controller 316 ends the control operation of the printing system 100.

(Printer Driver Processing)

Figure 5:
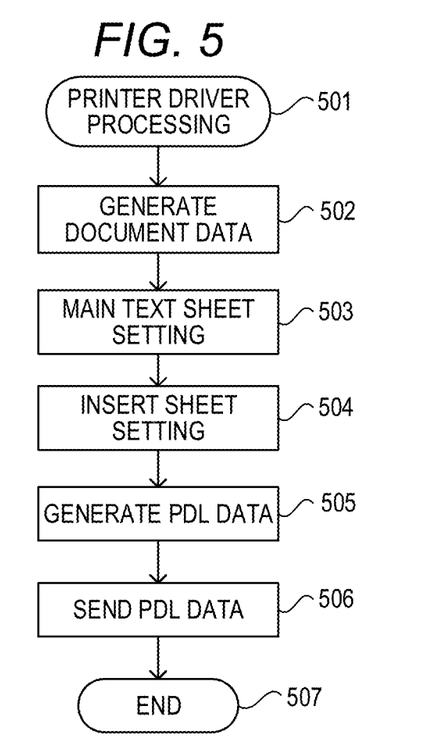
FIG. 5 is a flow chart for illustrating printer driver processing.
Figure 15:
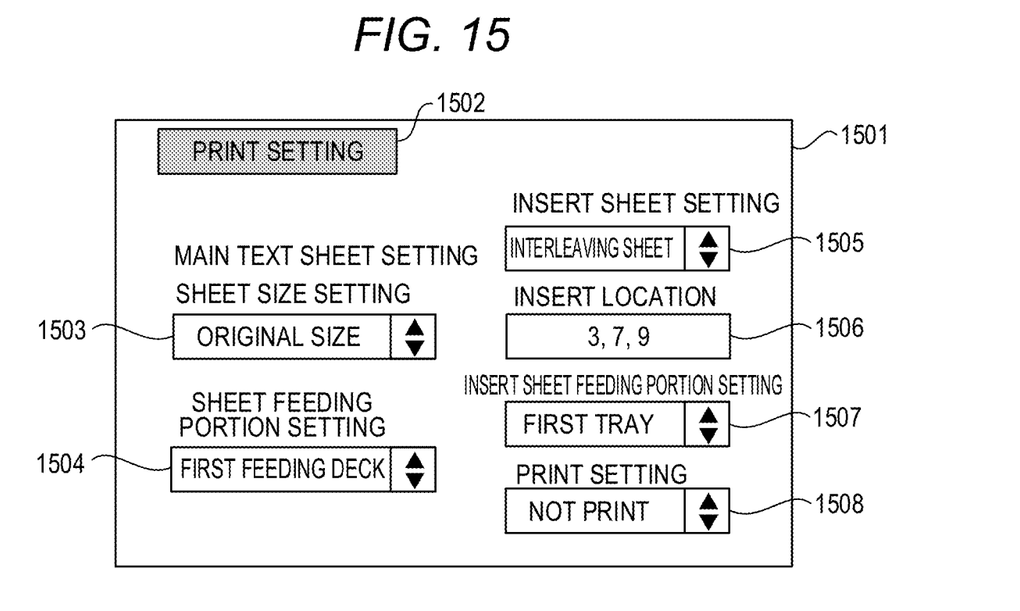
FIG. 15 is a diagram for illustrating a print setting screen.

Next, the printer driver processing to be executed in S403 of FIG. 4 is described with reference to FIG. 5. FIG. 5 is a flow chart for illustrating the printer driver processing. Firstly, a print setting screen 1501 displayed on the display portion of the PC 101 by the printer driver 303 is described with reference to FIG. 15. FIG. 15 is a diagram for illustrating the print setting screen 1501. The print setting screen 1501 includes a print setting tab 1502, a sheet size setting field 1503, a sheet feeding portion setting field 1504, an insert sheet setting field 1505, an insertion place setting field 1506, an insert sheet feeding portion setting field 1507, and a print setting field 1508. The print setting tab 1502 indicates that the print setting screen 1501 is displayed on the display portion of the PC 101. The sheet size setting field 1503 is used for setting the sheet size of the main text sheets. In FIG. 15, "original size" is set. In addition to "original size", sheet sizes that can be fed by the MFP 102, such as "A4 size" and "A3 size", can be set.

The sheet feeding portion setting field 1504 is used for setting a feeding portion configured to feed the sheets of the main text sheets. In FIG. 15, the "first feeding deck 202" is set. In addition to the "first feeding deck 202", feeding portions capable of feeding sheets by the MFP 102, such as the "second feeding deck 203" and the "third feeding deck 204", can be set. The insert sheet setting field 1505 is used for setting the type of insert sheet. In FIG. 15, "interleaving sheet" is set. In addition to "interleaving sheet", insert sheet types, such as "front cover" and "back cover", that can be inserted by the inserter 207 or the MFP 102 can be set. The insertion place setting field 1506 is used for inputting the insertion place of the "insert sheet" set in the insert sheet setting field 1505. In FIG. 15, three places, namely, "3, 7, 9", are set. The numerals "3, 7, 9" indicate that an insert sheet is to be inserted before the third page, the seventh page, and the ninth page of the main text sheets. The user can input an insertion place in the insertion place setting field 1506 by using a keyboard (not shown) included in the PC 101.

The insert sheet feeding portion setting field 1507 is used for setting the insert sheet feeding portion. In FIG. 15, the "first tray 208" is set. In addition to the "first tray 208", a feeding portion such as the "second tray 209" that can be fed by the inserter 207 connected to the MFP 102, or a feeding portion such as the "second feeding deck 203" or the "third feeding deck 204" that can be fed by the MFP 102 can be set. The print setting field 1508 is used for setting printing of the insert sheet. In FIG. 15, "not print" is set. In addition to "not print", "print" can be set. When the insert sheet is fed from the inserter 207, it is not possible to print on the insert sheet, and therefore only "not print" can be set. The user can change the settings by touching an up arrow button or a down arrow button on the right side of each of the sheet size setting field 1503, the sheet feeding portion setting field 1504, the insert sheet setting field 1505, the insert sheet feeding portion setting field 1507, and the print setting field 1508.

In S501, printer driver processing is started. In S502, the user generates document data 302 by using the document creation application. In this embodiment, the size of the document data 302 is "A4", but the size of the document data 302 may be B5, A3, or LTR (letter size). In S503, the user performs main text sheet setting. In the main text sheet setting, the user sets, in the sheet size setting field 1503, the sheet size of the main text sheets in the print setting screen 1501 displayed on the display portion of the PC 101 by the printer driver 303, and sets in the sheet feeding portion setting field 1504 the feeding portion for feeding the sheets. In this embodiment, "original size" is set in the sheet size setting field 1503, and "first feeding deck 202" is set in the sheet feeding portion setting field 1504. The setting "original size" indicates the page size of the document data 302, and in this embodiment, the "A4" size is set. As a result, when the printer engine 313 serving as the image forming portion of the MFP 102 executes the printing operation, an A4 size sheet is set to be fed from the first feeding deck 202 to the printer engine 313.

In S504, the user performs insert sheet setting. In the insert sheet setting, the user sets the type of insert sheet in the insert sheet setting field 1505 on the print setting screen 1501, sets the insertion place (insertion position) of the insert sheet in the insertion place setting field 1506, and sets in the insert sheet feeding portion setting field 1507 the feeding portion for feeding the insert sheet. The user also sets in the print setting field 1508 whether or not an image is to be formed on the insert sheet. In this embodiment, "interleaving sheet" is set in the insert sheet setting field 1505, "3, 7, 9" are set in the insertion place setting field 1506, "first tray 208" is set in the insert sheet feeding portion setting field 1507, and "not print" is set in the print setting field 1508. Based on this setting, interleaving sheets are fed from the first tray 208 of the inserter 207, and an interleaving sheet is inserted before the third page, the seventh page, and the ninth page of the main text sheets.

In S505, the printer driver 303 converts the document data 302 into PDL data. The printer driver 303 adds the information set by the main text sheet setting in S503 and the information set by the insert sheet setting in S504 to the PDL data. In S506, the printer driver 303 transmits the PDL data to the MFP 102 via the I/F 305, the network 103, and the I/F 307. In S507, the controller 316 ends the printer driver processing.

(Printer Processing)

Figure 6:
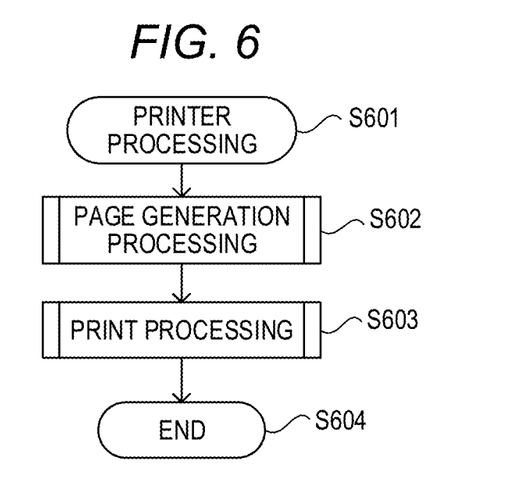
FIG. 6 is a flow chart for illustrating printer processing.

Next, the printer processing to be executed in S404 of FIG. 4 is described with reference to FIG. 6. FIG. 6 is a flow chart for illustrating the printer processing. In S601, the controller 316 starts the printer processing. In S602, the controller 316 performs page generation processing. In the page generation processing, the PDL data transmitted from the PC 101 is converted into image data. At this time, the controller 316 stores in the storage portion 315 a total page number P_MAX (variable) of the PDL data. Details of the page generation processing are described later with reference to FIG. 7. In S603, the controller 316 performs print processing. In the print processing, the controller 316 controls the printer engine 313 and converts the image data generated in S602 into video data. The printer engine 313 forms an image on the sheets in accordance with the video data. The sheets on which an image has been formed are optionally subjected to post-processing together with the insert sheets when there are insert sheets, and then discharged to the first discharge tray 211, the second discharge tray 212, or the third discharge tray 213. Details of the print processing are described later with reference to FIG. 8. In S604, the controller 316 ends the printer processing.

(Page Generation Processing)

Figure 7:
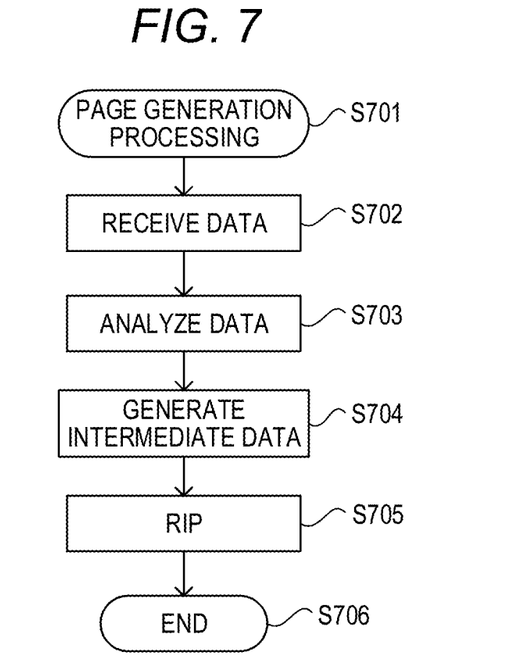
FIG. 7 is a flow chart for illustrating page generation processing.

Next, the page generation processing to be executed in S602 of FIG. 6 is described with reference to FIG. 7. FIG. 7 is a flow chart for illustrating the page generation processing. In S701, the controller 316 starts the page generation processing. In S702, the data receiving portion 308 receives the PDL data generated by the printer driver 303 from the document data 302 generated by the document creation application installed on the PC 101. In S703, the interpreter 309 analyzes the PDL data received from the data receiving portion 308.

In S704, the controller 316 generates intermediate data from the PDL data analyzed by the interpreter 309. Intermediate data is a generic name of drawing objects such as "bitmap", "run length", "trapezoidal", "box", and "high-speed boundary-coded bitmap" with a background pattern, and a drawing logic at a time when the drawing object and the background pattern are rendered in a raster memory (not shown). When the information on the sheet size of the main text sheets and the sheet feeding portion set in S503 and the insert sheet type, insertion place, insert sheet feeding portion, and print setting set in S504 are added to the PDL data, the controller 316 stores each setting in the storage portion 315. In this embodiment, sheet information indicating "A4" as the sheet size of the main text sheets and "first feeding deck 202" as the sheet feeding portion is stored in the storage portion 315. Further, insert sheet information indicating that the insert sheet type is "interleaving sheet", the insertion places are "before the third page, before the seventh page, and before the ninth page of the main text sheets", the insert sheet feeding portion is "first tray 208", and the print setting is "not print" is stored in the storage portion 315. The controller 316 calculates the total page number P_MAX of the PDL data and stores the total page number P_MAX in the storage portion 315.

In S705, the controller 316 instructs the renderer 311 to process the intermediate data 310 by using a raster image processor (hereinafter referred to as "RIP"). The renderer 311 converts the intermediate data 310 into image data by using the RIP, and stores the image data in the image data storage portion 312. In S706, the controller 316 ends the page generation processing.

(Print Processing)

Figure 8:
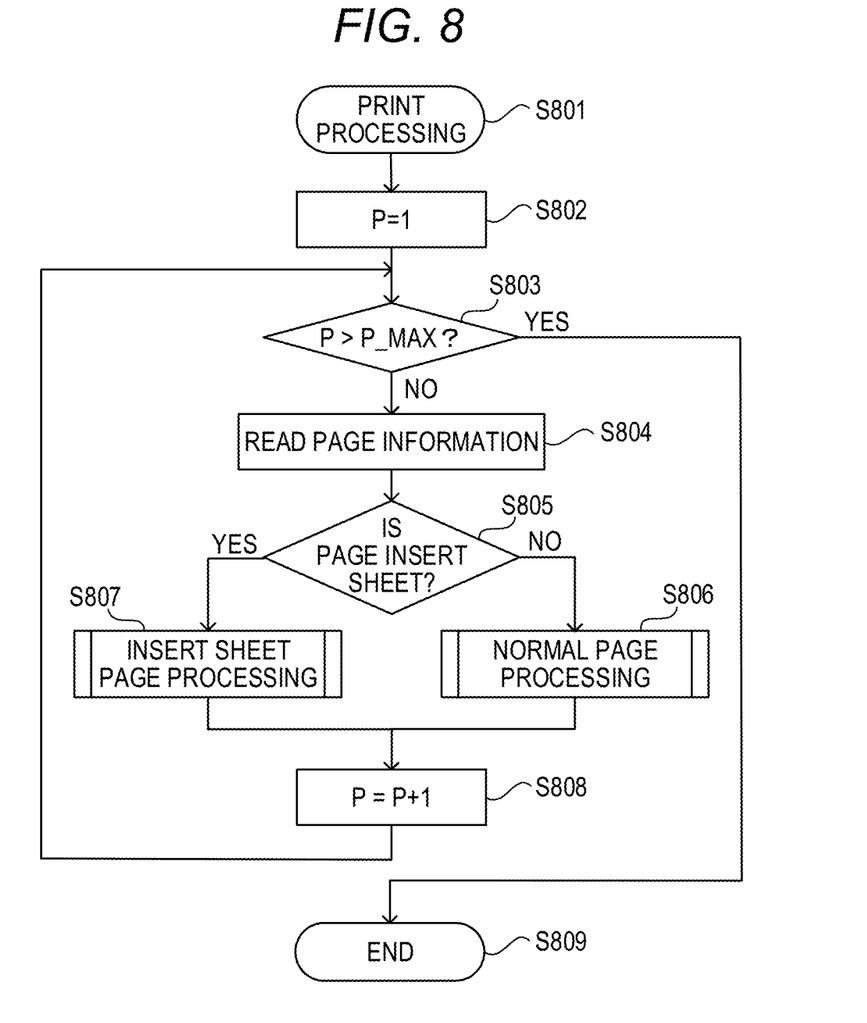
FIG. 8 is a flow chart for illustrating print processing.

Next, the print processing to be executed in S603 of FIG. 6 is described with reference to FIG. 8. FIG. 8 is a flow chart for illustrating the print processing. In S801, the controller 316 starts the print processing. In S802, the controller 316 initializes a parameter P indicating the number of pages being processed to P=1. The parameter P is an integer value of 1 or more (P≥1). In S803, the controller 316 determines whether or not the parameter P is larger than the total page number P_MAX. In S704, the total page number P_MAX is stored in the storage portion 315. The controller 316 reads the total page number P_MAX from the storage portion 315, and compares the total page number P_MAX with the parameter P. When the parameter P is equal to or smaller than the total page number P_MAX (NO in S803), the controller 316 determines that there is still a page that can be printed, and advances the processing to S804. When the parameter P is larger than the total page number P_MAX (YES in S803), the controller 316 determines that there is no page that can be printed, and ends the print processing (S809).

In S804, the controller 316 reads the page information on the parameter P from the storage portion 315. In S805, the controller 316 analyzes the page information read from the storage portion 315, and determines whether or not the page is an insert sheet. Whether or not the page is an insert sheet is determined by reading the insert sheet type stored in the storage portion 315. When the controller 316 determines that the page is not an insert sheet (NO in S805), the controller 316 advances the processing to S806. When the controller 316 determines that the page is an insert sheet (YES in S805), the controller 316 advances the processing to S807.

In S806, the controller 316 executes normal page processing. In normal page processing, the controller 316 converts the image data generated in S602 into video data, and transfers the video data to the printer engine 313. The printer engine 313 forms an image on the sheet in accordance with the video data, and performs discharge processing. Details of the normal page processing are described later with reference to FIG. 12. In S807, the controller 316 executes insert sheet page processing. In the insert sheet page processing, the controller 316 executes processing of inserting an interleaving sheet fed from the inserter 207 into the main text sheets. Details of the insert sheet page processing are described later with reference to FIG. 9. In S808, the controller 316 changes the parameter P indicating the page being processed to the next page (P=P+1), and returns the processing to S803. When the parameter P is larger than the total number of pages P_MAX (YES in S803), the controller 316 ends the print processing (S809).

(Insert Sheet Page Processing)

Figure 9:
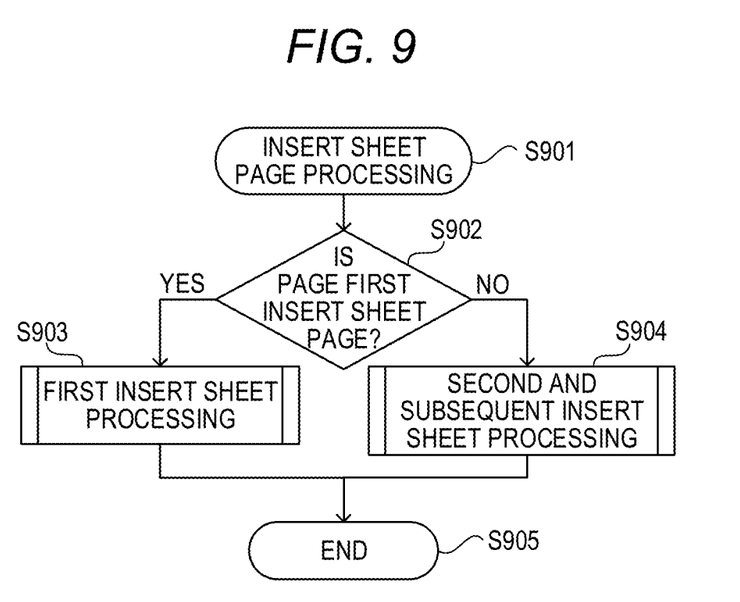
FIG. 9 is a flow chart for illustrating insert sheet page processing.

Next, the insert sheet page processing to be executed in S807 of FIG. 8 is described with reference to FIG. 9. FIG. 9 is a flow chart for illustrating the insert sheet page processing. In S901, the controller 316 starts the insert sheet page processing. In S902, the controller 316 determines whether or not the page is the first insert sheet page. Whether or not the page is the first insert sheet page is determined by the controller 316 reading the insertion place of the insert sheet from the storage portion 315. When it is determined that the page is the first insert sheet page (YES in S902), the controller 316 advances the processing to S903. When it is determined that the page is the second or subsequent insert sheet page (NO in S902), the controller 316 advances the processing to S904. In S903, the controller 316 executes the first insert sheet processing. Details of the first insert sheet processing are described later with reference to FIG. 10. In S904, the controller 316 executes second and subsequent insert sheet processing. Details of the second and subsequent insert sheet processing are described later with reference to FIG. 11. In S905, the controller 316 ends the insert sheet page processing.

(First Insert Sheet Processing)

Figure 10:
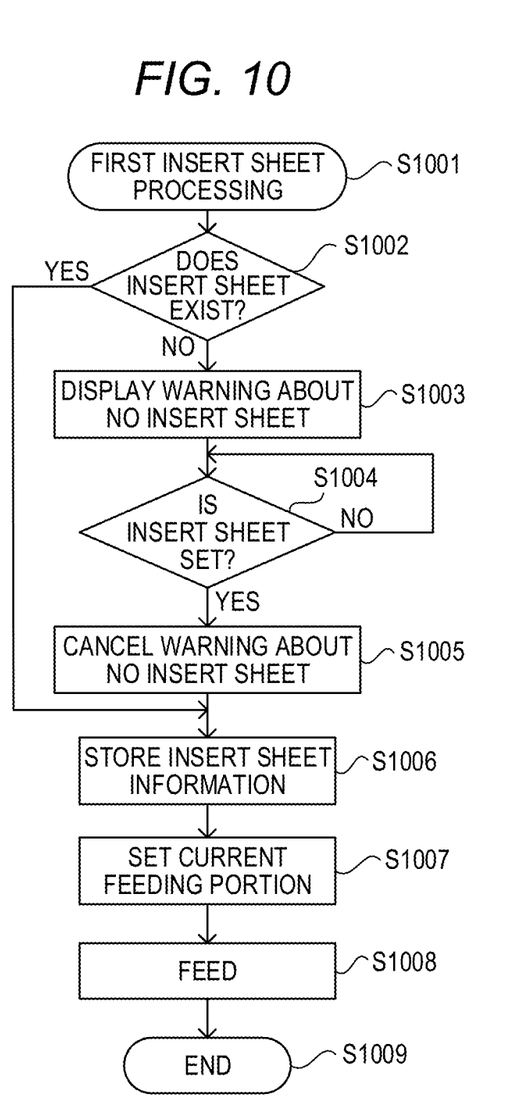
FIG. 10 is a flow chart for illustrating first insert sheet processing.

Next, the first insert sheet processing to be executed in S903 of FIG. 9 is described with reference to FIG. 10. FIG. 10 is a flow chart for illustrating the first insert sheet processing. In S1001, the controller 316 starts the first insert sheet processing. In S1002, the controller 316 reads the insert sheet information from the storage portion 315. There is described here a case in which the insert sheet information read from the storage portion 315 by the controller 316 includes only the feeding portion setting of the insert sheet, and does not include the size setting or the type setting of the insert sheet. The controller 316 reads the feeding portion setting of the insert sheet, and determines whether or not the insert sheet exists in the read insert sheet feeding portion. In this embodiment, there is described a case in which the first tray 208 is set as the insert sheet feeding portion. When it is determined that the insert sheet exists on the first tray 208 (YES in S1002), the controller 316 advances the processing to S1006. When it is determined that the insert sheet does not exist on the first tray 208 (NO in S1002), the controller 316 advances the processing to S1003.

Figure 14:
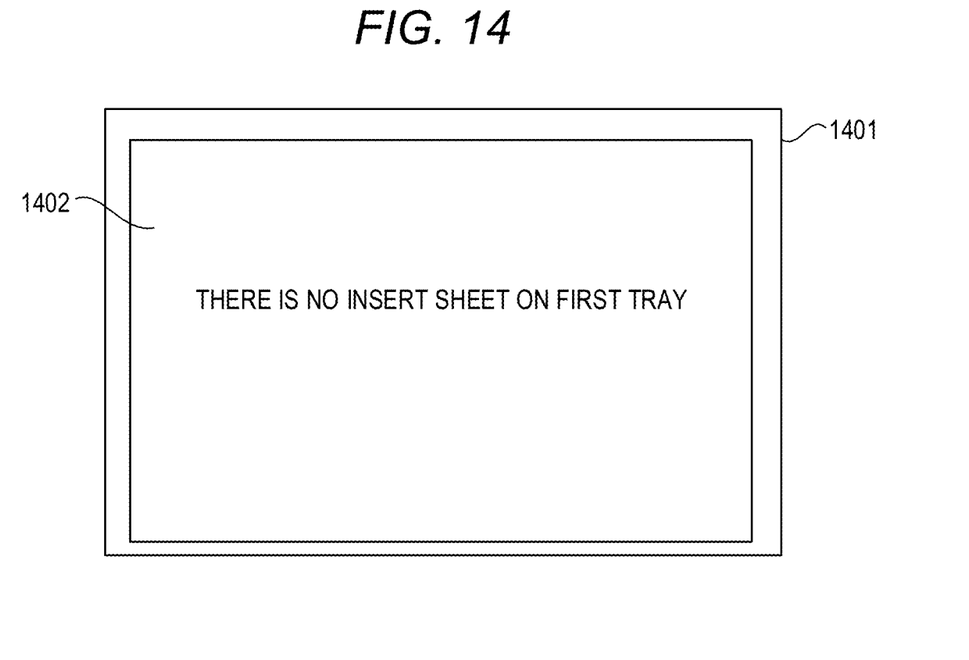
FIG. 14 is a diagram for illustrating a no insert sheet warning screen.

In S1003, the controller 316 displays a no insert sheet warning screen 1401 on the UI 317. Even in a case where the controller 316 is set to perform the automatic feed changeover, when the insert sheet is not stacked on the first tray 208 at the time of feeding the first insert sheet from the start of the print job, the automatic feed changeover is disabled. The no insert sheet warning screen 1401 displayed on the UI 317 is now described with reference to FIG. 14. FIG. 14 is a diagram for illustrating the no insert sheet warning screen 1401. The no insert sheet warning screen 1401 displays a warning "There is no insert sheet on first tray". Similarly, when it is determined that there is no insert sheet on the insert sheet feeding portions other than the first tray 208, the warning is displayed on the no insert sheet warning screen 1401. In S1004, the controller 316 determines whether or not the insert sheet is set on the first tray 208. Whether or not the insert sheet is set is detected by the sheet sensor 218 arranged on the first tray 208. When the controller 316 determines that the insert sheet is not set on the first tray 208 (NO in S1004), the controller 316 returns the processing to S1004, and repeats the determination of S1004 until the insert sheet is set on the first tray 208. When the controller 316 determines that the insert sheet is set on the first tray 208 (YES in S1004), the controller 316 advances the processing to S1005.

In S1005, the controller 316 stops displaying the no insert sheet warning screen 1401 displayed on the UI 317, and cancels the no insert sheet warning. In S1006, the controller 316 sets the first tray 208 as the current feeding portion, and stores information on the first tray 208 serving as the current feeding portion in the storage portion 315. The information on the current feeding portion is set for the first time at this point (S1007). In S1008, the controller 316 feeds the insert sheet from the first tray 208 serving as the current feeding portion. In S1009, the controller 316 ends the first insert sheet processing.

(Second and Subsequent Insert Sheet Processing)

Figure 11:
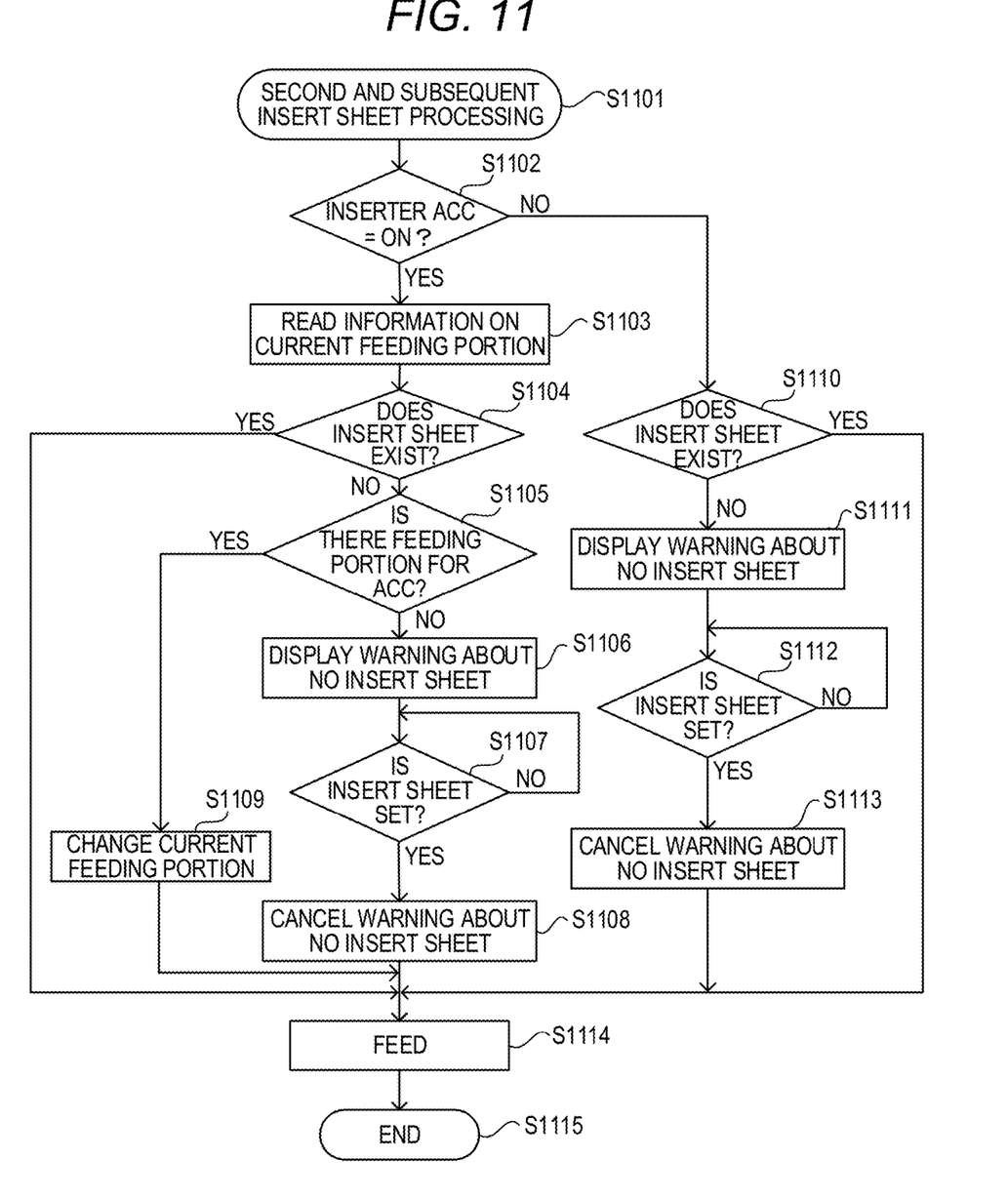
FIG. 11 is a flow chart for illustrating second and subsequent insert sheet processing.

Next, the second and subsequent insert sheet processing to be executed in S904 of FIG. 9 is described with reference to FIG. 11. FIG. 11 is a flow chart for illustrating the second and subsequent insert sheet processing. After the first insert sheet is fed from the start of the print job, feeding of the second and subsequent insert sheets is performed. In S1101, the controller 316 starts the second and subsequent insert sheet processing. In S1102, the controller 316 determines whether or not the inserter automatic changeover (inserter ACC) is set to the ON state. When the controller 316 determines that inserter automatic changeover is set to the ON state (YES in S1102), the controller 316 advances the processing to S1103. When the controller 316 determines that the inserter automatic changeover is set to the OFF state, the controller 316 advances the processing to S1110.

In S1103, the controller 316 reads the information on the current feeding portion from the storage portion 315. In S1104, the controller 316 reads the current feeding portion from the information on the current feeding portion, and determines whether or not the insert sheet exists on the current feeding portion. When the controller 316 determines that the insert sheet does not exist on the current feeding portion (NO in S1104), the controller 316 advances the processing to S1105. When the controller 316 determines that the insert sheet exists on the current feeding portion (YES in S1104), the controller 316 advances the processing to S1114.

In S1105, the controller 316 determines whether or not there is a feeding portion capable of performing the inserter automatic changeover. Whether or not there is a feeding portion capable of performing the inserter automatic changeover is determined based on whether or not the same insert sheet as the insert sheet set on the current feeding portion is set on a feeding portion other than the current feeding portion. When the controller 316 determines that there is a feeding portion capable of performing the inserter automatic changeover (YES in S1105), the controller 316 advances the processing to S1109. When the controller 316 determines that there is no feeding portion capable of performing the inserter automatic changeover (NO in S1105), the controller 316 advances the processing to S1106.

In S1106, the controller 316 displays the no insert sheet warning screen 1401 on the UI 317. In S1107, the controller 316 determines whether or not the insert sheet is set on the current feeding portion. Whether or not the insert sheet is set on the current feeding portion is determined based on the detection result of the sheet sensor 218 when the current feeding portion is the first tray 208, and based on the detection result of the sheet sensor 219 when the current feeding portion is the second tray 209. When the controller 316 determines that the insert sheet is not set on the current feeding portion (NO in S1107), the controller 316 returns the processing to S1107, and repeats the determination of S1107 until the insert sheet is set on the current feeding portion. When the controller 316 determines that the insert sheet is set on the current feeding portion (YES in S1107), the controller 316 advances the processing to S1108.

In S1108, the controller 316 stops displaying the no insert sheet warning screen 1401 displayed on the UI 317, and cancels the no insert sheet warning. In S1109, the controller 316 changes the current feeding portion to another feeding portion on which the same insert sheet is set. The change from the current feeding portion is performed by the inserter automatic feed changeover. The controller 316 stores information on the changed current feeding portion in the storage portion 315. When no insert sheet is set on the first tray 208 specified by the PDL data (print job), the controller 316 performs the automatic feed changeover for feeding the insert sheet from the second tray 209.

In S1110, the controller 316 determines whether or not the insert sheet exists on the current feeding portion. When the controller 316 determines that the insert sheet does not exist on the current feeding portion (NO in S1110), the controller 316 advances the processing to S1111. When the controller 316 determines that the insert sheet exists on the current feeding portion (YES in S1110), the controller 316 advances the processing to S1114.

In S1111, the controller 316 displays the no insert sheet warning screen 1401 on the UI 317. In S1112, the controller 316 determines whether or not the insert sheet is set on the current feeding portion. When the controller 316 determines that the insert sheet is not set on the current feeding portion (NO in S1112), the controller 316 returns the processing to S1112, and repeats the determination of S1112 until the insert sheet is set on the current feeding portion. When the controller 316 determines that the insert sheet is set on the current feeding portion (YES in S1112), the controller 316 advances the processing to S1113.

In S1113, the controller 316 stops displaying the no insert sheet warning screen 1401 displayed on the UI 317, and cancels the no insert sheet warning. In S1114, the controller 316 feeds the insert sheet from the current feeding portion. As a result, the insert sheet is inserted between the sheets on which an image has been formed. In S1115, the controller 316 ends the second and subsequent insert sheet processing.

(Normal Page Processing)

Figure 12:
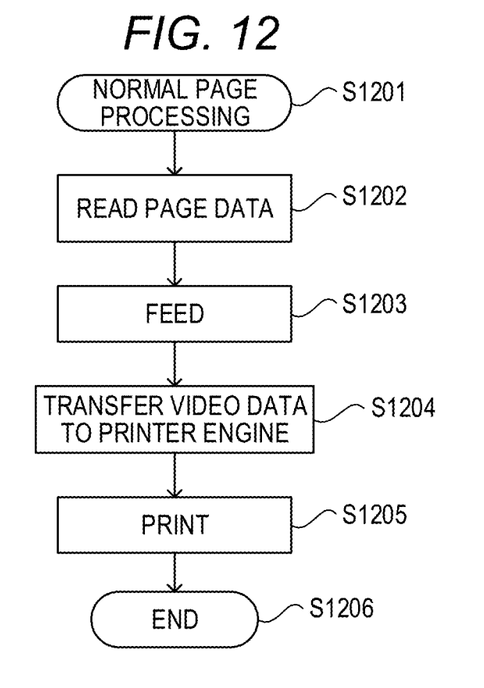
FIG. 12 is a flow chart for illustrating normal page processing.

Next, the normal page processing to be executed in S806 of FIG. 8 is described with reference to FIG. 12. FIG. 12 is a flow chart for illustrating normal page processing. In 51201, the controller 316 starts normal page processing. In 51202, the controller 316 reads the image data of the page being processed from the image data storage portion 312. In S1203, the controller 316 feeds a sheet from the first feeding deck 202. In S1204, the controller 316 converts the image data stored in the image data storage portion 312 into video data, and transfers the video data to the printer engine 313. In S1205, the controller 316 performs printing in accordance with the video data on the sheet fed from the first feeding deck 202. In S1206, the controller 316 ends the normal page processing.

According to this embodiment, the feeding of an insert sheet not intended by the user can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-004212, filed Jan. 15, 2019, which is hereby incorporated by reference herein in its entirety.

What is claimed is:

1. An image forming apparatus comprising:
an image former configured to form an image on a sheet;
an inserter having a plurality of trays on each of which an insert sheet is to be stacked and configured to insert the insert sheet between sheets on which images are formed by the image former;
a receiver configured to receive a print job including identification information to identify a selected tray from which the insert sheet should be fed from among the plurality of trays;
a controller configured to perform an automatic changeover in which, in a case in which the selected tray runs out of the insert sheet, an insert sheet is fed from a tray other than the selected tray of the plurality of trays; and
a user interface configured to set the automatic changeover,
wherein in a case in which there is no insert sheet on the selected tray after a first insert sheet which is fed by the inserter at a first time in the print job is fed from the selected tray, the controller performs the automatic changeover based on a setting of the automatic changeover, and in a case in which the first insert sheet is not on the selected tray originally, the controller does not perform the automatic changeover regardless of the setting of the automatic changeover.

2. The image forming apparatus according to claim 1, wherein the controller is configured to display on the user interface a warning indicating that the first insert sheet is not stacked on the selected tray.

3. The image forming apparatus according to claim 1, wherein the insert sheet is a front cover, a back cover, or an interleaving sheet.

4. The image forming apparatus according to claim 1, wherein the print data is written in a page description language.

5. The image forming apparatus according to claim 1, wherein in a case in which the controller executes the automatic changeover, the controller controls the inserter to insert an insert sheet that is of a same type as that of the first insert sheet from the tray other than the selected tray of the plurality of trays.

6. The image forming apparatus according to claim 5, wherein in a case in which the insert sheet of the same type is not stacked on any tray, the controller displays an error on the user interface.

7. The image forming apparatus according to claim 1, wherein the inserter includes a sensor provided at each of the plurality of trays and configured to detect the insert sheet.

8. An image forming apparatus comprising:
- an image former configured to form an image on a sheet;
- an inserter having a plurality of trays on each of which an insert sheet is to be stacked and configured to insert the insert sheet between sheets on which images are formed by the image former;
- a receiver configured to receive a print job including identification information to identify a selected tray from which the insert sheet should be fed from among the plurality of trays;
- a controller configured to perform an automatic changeover in which, in a case in which the selected tray runs out of the insert sheet, an insert sheet is fed from a tray other than the selected tray of the plurality of trays; and
- a user interface configured to set the automatic changeover,
- wherein in a case in which there is no insert sheet on the selected tray after the insert sheet is fed from the selected tray, the controller performs the automatic changeover based on a setting of the automatic changeover, and in a case in which there is no insert sheet on the selected tray at a start of the print job, the controller does not perform the automatic changeover regardless of the setting of the automatic changeover.

* * * * *